Aug. 26, 1952 — T. J. B. CONNOR — 2,608,426
KNOT TYING MECHANISM
Filed April 30, 1948 — 4 Sheets-Sheet 1

INVENTOR
THOMAS J. B. CONNOR
By Young, Emery & Thompson
Attys.

Aug. 26, 1952   T. J. B. CONNOR   2,608,426
KNOT TYING MECHANISM
Filed April 30, 1948   4 Sheets-Sheet 2

INVENTOR
THOMAS J. B. CONNOR

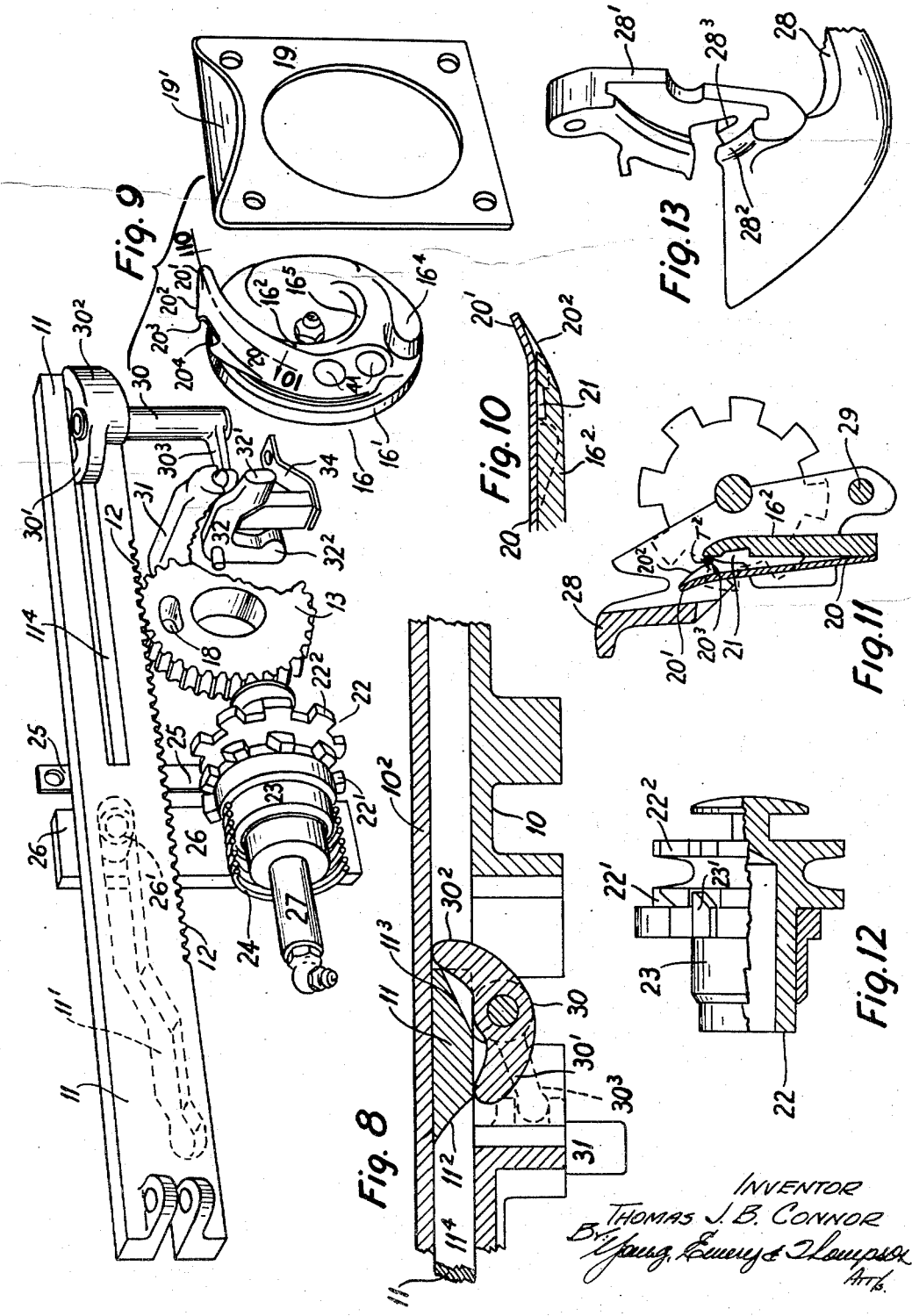

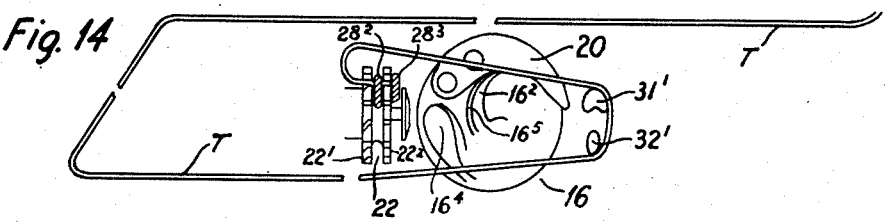
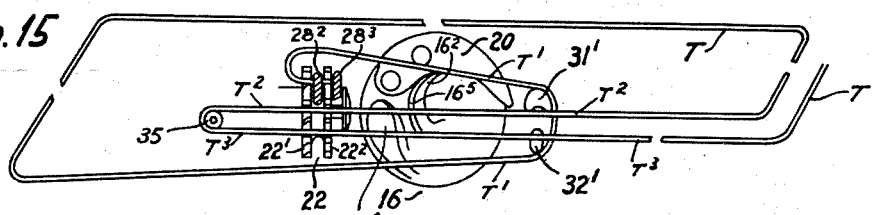
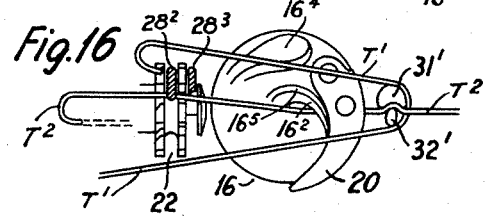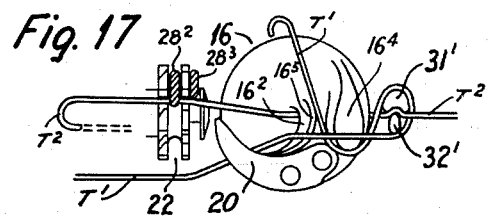
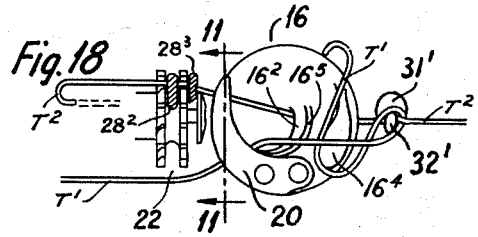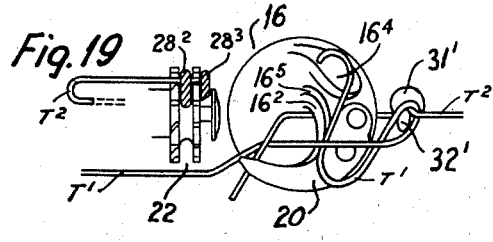
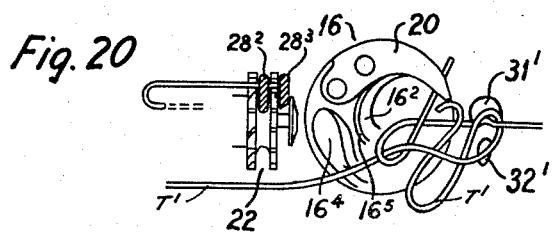
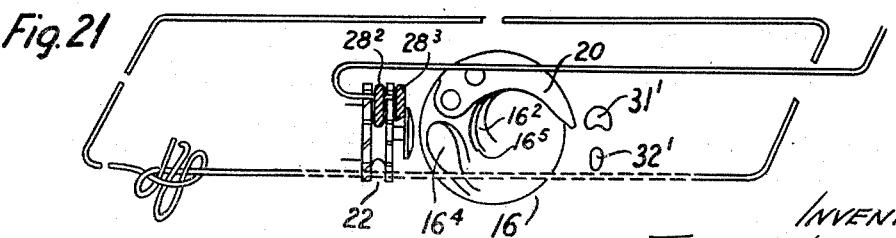

Patented Aug. 26, 1952

2,608,426

UNITED STATES PATENT OFFICE 2,608,426

KNOT TYING MECHANISM

Thomas James Bailey Connor, Sunshine, Victoria, Australia, assignor to H. V. McKay Massey Harris Proprietary Limited, Sunshine, Victoria, Australia Application April 30, 1948, Serial No. 24,274
In Australia May 2, 1947

12 Claims. (Cl. 289—1)

This invention relates to knot tying mechanism devised primarily for use in agricultural implements such as portable hay baling presses, though its use is not confined thereto.

It is known to use both twine and wire to bind hay bales formed in such presses and mechanical means for joining the ends of twine by tying same together are known. Such mechanical twine tying or knotting means, however, are not generally suitable for joining the ends of tie wires, and although the ends of the latter may be secured together by known mechanical twisting means, the result is not entirely satisfactory for the reason that the twisted wires are apt to untwist when subjected to a tension considerably below the breaking strength of the wire.

Now the general object of this invention is to provide an improved method of and means for tying flexible members together, such means having been devised primarily for joining the ends of tie wires, but being applicable also to twine and other flexible members.

Accordingly, the invention includes the method of connecting flexible members comprising forming a more or less U-shaped bend or open loop in a flexible member, laying a second flexible member above and between the arms of said bend formed in the firstmentioned member, mechanically carrying one arm of said bend above said second member and then below the opposite arm to convert said bend into a turn which extends around said second member, and mechanically carrying a portion of said second member, spaced from said bend in the first member, around said opposite arm of the firstmentioned member to form a turn around the latter.

Thus the knot produced has a half hitch in the free end portion of each flexible member and extending around the other member. When the tied members are subjected to tension, the two half hitches are pulled together so that the free end portions are compressed and are thereby prevented from slipping.

The invention also includes knot tying mechanism comprising means for supporting the opposed arms of a more or less U-shaped bend formed in a flexible member, means for supporting a second flexible member more or less longitudinally between the arms and somewhat in advance of the U-bend in the firstmentioned flexible member, means operable to form a turn in said firstmentioned flexible member and around the second mentioned member, and means operable to form a turn in said second mentioned flexible member and around said firstmentioned member.

The said mechanism preferably comprises a reversible angularly movable or semi rotary arm of arcuate adapted to displace said flexible members in the direction parallel to the axis of rotation and characterised by the provision on the free end portion of said arm of engaging and gripping means.

The said arcuate arm is also preferably provided intermediate its ends with a projection for engaging and forming a loop in one of said flexible members.

The mechanism also preferably includes gripping means arranged at one side of the semi rotary member, retractable holding means arranged at the opposite side thereof and means for actuating said semi rotary member, said gripping means and said retractable holding means in timed relation.

A feature of the invention resides in actuating said elements in timed relationship by means of a common reciprocating member.

Said reciprocating member preferably incorporates a toothed rack engaging a pinion coupled to said semi rotary member, and same preferably incorporates a cam for engagement by actuating members suitably coupled to said gripping means and said retractable holding means.

Other features of the invention reside in the construction, arrangement and manner of operation of the mechanism as hereinafter described.

For a more particular description of the invention reference will be made to the accompanying drawings in which.

Figure 1:
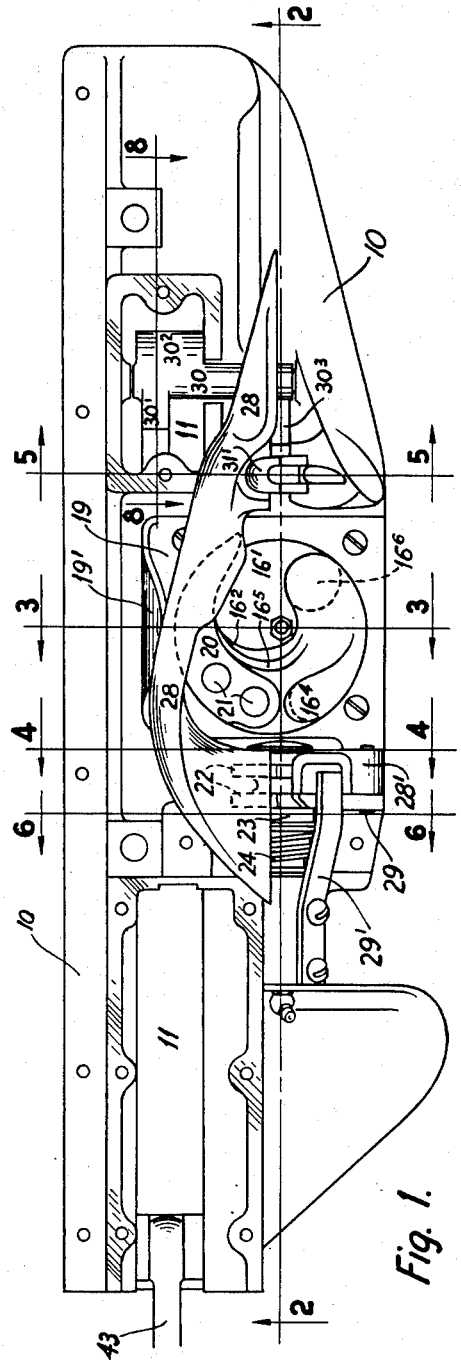
Figure 1 is a view in front elevation of the preferred construction of tying mechanism in accordance with the invention.
Figures 3, 4, 5:
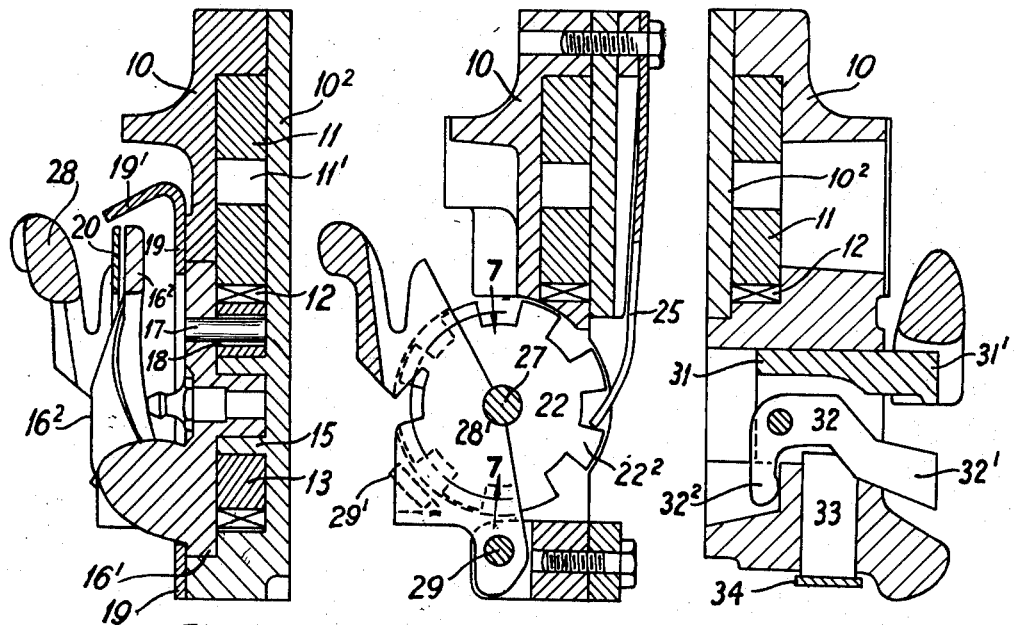
Figures 5A, 6, 7:
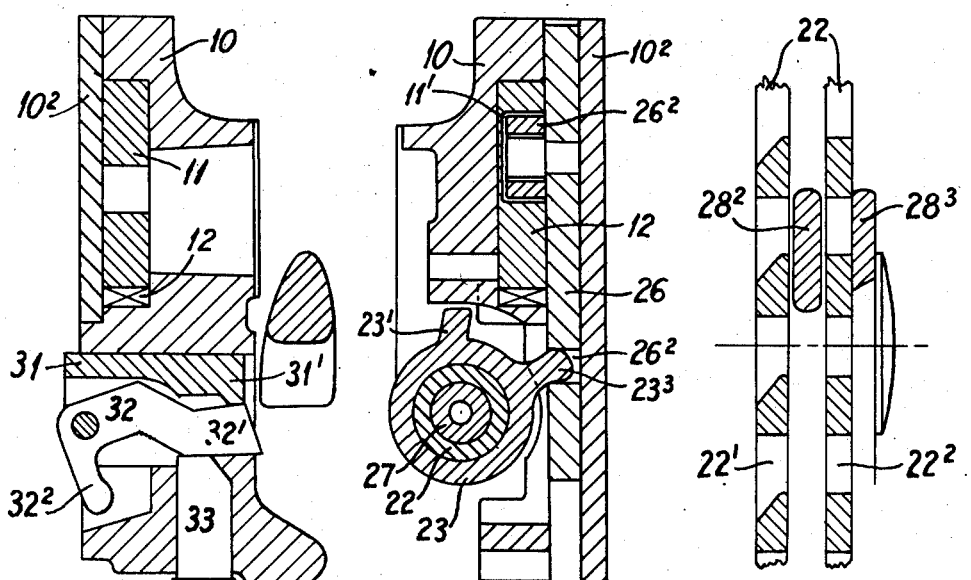

Figures 3, 4, 5 and 6 are views in sectional end elevation respectively on the lines 3—3, 4—4, 5—5 and 6—6 of Figure 1;

Figure 5A is a view similar to Figure 5 and shows another operative position of the parts;

Figure 7 is a developed sectional view on the curved line 7—7 of Figure 4;

Figure 8 is a fragmentary sectional plan view taken on the line 8—8 of Figure 1;

Figure 9 is a partly exploded view in oblique projection of certain operative parts of the mechanism;

Figure 10 is a sectional view taken approximately on the curved line 10—10 of Figure 9;

Figure 11 is a section taken on the line 11—11 of Figure 18;

Figure 12 is a view in plan and partly in section of a gripping member and actuator therefor;

Figure 13 is a perspective view from the rear of a guide and retaining member from which parts have been broken away, and Figures 14 to 21 inclusive are views showing different stages in the operation of the mechanism, such views being partly diagrammatic with parts shown in plan and parts in section.

The mechanism shown in the drawings comprises a main frame member 10 adapted to be secured in the required position, for example at one side of the compression chamber of a portable hay baling press, such frame being of somewhat elongated generally rectangular shape in cross section and being relatively long in proportion to its width. This main frame may be arranged in any attitude suitable for the purpose required, but for convenience in description it will be assumed that same is arranged horizontally and "on edge," that is to say with its faces disposed vertically, such position being suitable when same is used on a portable hay baling press as abovementioned.

Figure 2:
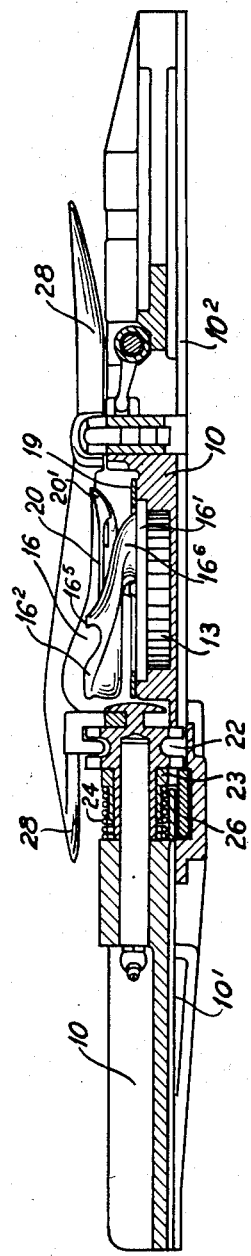
Figure 2 is a view in inverted sectional plan and is taken on the line 2—2 of Figure 1.

The rear face of the frame is formed with a longitudinally extending open slot in which a reciprocable slide 11 is arranged on edge, said slide being relatively wide and long and being retained in position by cover plates $10^1$ and $10^2$. This slide is coupled at one end by a connecting rod 43 to a crank (not shown) associated with actuating means adapted at each operation to move said crank through one complete revolution whereby the slide is advanced from and then retracted to its initial position, shown in Figure 2.

The lower edge of the slide 11 is formed with rack teeth 12 which are in constant mesh with a pinion 13 received in an accommodating recess formed more or less centrally in the front face of the frame and rotatively supported on a fixed stub axis 15 projecting inwardly from the cover plate $10^2$, the axis of said pinion being disposed horizontally and transversely with respect to the direction of reciprocation of the slide 11.

A loop forming member generally designated 16 and arranged coaxially with and in front of the pinion 13 has a disc like rear end 16, which is accommodated in a counterbore in said recess for the pinion, and this disc is provided on its rear face with an eccentric driving pin 17 which projects into an arcuate slot 18 in the adjacent face of the pinion whereby these members are constrained to move in unison, except when the rotation of the pinion is reversed, when the said slot 18 permits of limited lost motion. A detachable retaining plate 19 secured to the front face of the frame is provided with a large central hole through which the loop forming member projects forwardly and the inner peripheral portion of this plate overlaps the peripheral portion of the front face of the disc 16' of the loop forming member and so prevents axial movements of the latter without interfering with the angular movements thereof. The upper end of this retaining plate is bent forwardly and downwardly to form an inclined guide 19'.

An arcuate arm $16^2$ which is approximately concentric with the axis of the disc 16', and subtends an angle of rather more than 180° at the axis thereof is disposed somewhat in advance of the retaining plate 19 and one end of this arm is connected to said disc by an eccentric integral projection $16^6$ on the latter.

A cantilever strip 20 of stiff spring steel or other suitable material has its inner end secured by rivets 41 to an intermediate portion of the length of the arm $16^2$ and the tip or free end 20' of this strip projects beyond the free end of the arm. This projecting tip 20' is bent forwardly to some extent, i. e. outwardly from the disc 16' and same is formed with shallow inwardly turned side flanges $20^2$ between which the tip of the arm $16^2$ is located. The outer flange $20^2$ is formed with a slot defined by a forward shoulder $20^3$ and a rear shoulder $20^4$ while the inner flange $20^2$ terminates in a shoulder $20^5$ disposed opposite to the shoulder $20^3$ of the outer flange. The undersurface of the tip portion of the arm $16^2$ is curved outwardly towards the tip so as normally to form a smooth continuation of the inclined deflecting surfaces constituted by the free inner edges of the flanges $20^2$ as best shown in Figures 10 and 11.

The aforesaid shoulders $20^3$ and $20^4$ coact with the intervening portions of the cantilever spring 20 and arm $16^2$ to form a transverse clearance space 21 for a flexible tie member, but access to this space 21 is normally closed by the free end portion of said cantilever spring 20 which bears firmly against the free end portion of the arm $16^2$ as shown in Figure 10. Thus the tip portions of the arm $16^2$ and spring 20 form coacting jaws which may be opened to permit of access to the clearance space 21.

The arm $16^2$ is also provided approximately midway between its ends with an outward projection $16^4$ adapted to engage and form a loop in a flexible member as hereafter described, for which purpose the forward end thereof, i. e. the end nearest the free end of said arm is preferably rounded and somewhat undercut as indicated by dotted lines in Figure 1. Finally an outwardly projecting guide flange $16^5$ is preferably provided on the inner edge portion of the arm $16^2$ opposite to the projection $16^4$ thereon.

The loop forming member 16 is normally disposed approximately in the position shown in Figure 1, the operating slide 11 being then at the outer end of its stroke. Thus as the slide is moved inwards in the direction of the arrow shown in Figure 1, a clockwise movement is imparted to the member 16 whereby when the slide has reached the inner end of its stroke the member 16 has moved through rather more than one half of a revolution, the final position thereof being shown in Figure 18, to which further reference is hereinafter made.

Likewise when the slide is retracted to its normal position the member 16 undergoes an anticlockwise movement and returns to the position shown in Figure 1.

An intermittently rotatable gripper member 22 supported on a pin 27 secured to the frame is arranged at the left hand side of the loop forming member 16, the axis of this gripper member being disposed longitudinally of the frame and substantially in the plane of the axis of said loop forming member as shown.

This gripper member comprises a boss carrying a coaxially spaced pair of circumferential flanges 22' and $22^2$ respectively, formed with regularly spaced opposed pairs of notches and intervening teeth, and same is partly accommodated in a recess in the front face of the frame.

When the mechanism is in use the gripper member is intermittently rotated in such direction that the forwardly projecting portions of the flanges 22' and $22^2$ thereof move upwardly, i. e. clockwise in Figure 4, and such intermittent movements are imparted thereto by an angularly oscillatable actuator 23 supported for both angular and sliding movements on the boss of the gripper member and normally maintained in contact with the flange 22' of the latter by a compression spring 24. The actuator is provided with an eccentric driving projection 23' which normally projects into one of the notches in the adjacent flange 22' of the gripper member between an adjacent pair of teeth thereon, such projection being bevelled on its rear face while the forward faces of the coacting teeth on said flange 22' of the gripper member are similarly bevelled whereby when the actuator undergoes retrograde movements it is displaced axially in opposition to the spring 24 to disengage the projection 23'. Retrograde movements of the gripper member are prevented by a retaining pawl in the form of a resilient cantilever strip 25 (Figures 4 and 9).

The actuator is moved intermittently forwardly and rearwardly during each complete cycle of operations by a vertical slide bar 26 mounted in a guide slot and provided adjacent its lower end with a transverse recess 26' for a radial projection $23^2$ on the actuator, while the upper end portion of this vertical slide bar is fitted with a forward projection $26^2$ which is received in a cam slot 11' in the rear face of the main slide 11. This cam slot is formed with two spaced inclined portions whereby as the slide undergoes its inward stroke the gripper member undergoes two forward movements each approximately equal to one-half of the pitch of the teeth thereon, while during the return stroke of the slide the actuator 23 is moved rearwardly and the gripper member is held stationary by the detent 25. Thus the gripper member 22 is advanced one tooth during each cycle of operations.

The gripper member 22 coacts with an elongated retaining and guide member 28 which extends in a generally longitudinal direction in front, and above the axis, of the loop forming and gripper members 16 and 22 respectively, and same is provided adjacent one end with an integral depending arm 28', the lower end of which is pivotally connected to the frame by a pin 29 or is otherwise suitably mounted thereon for rocking movements. This arm 28' extends through and is guided by a circumferential groove in the inner end of the gripper member and the forward edge of this arm is disposed flush with or below the inner ends of the centrally disposed notches in the gripper member so that access to said notches is not obstructed (see Fig. 4).

The arm 28' of retaining and guide member is provided somewhat above the horizontal plane containing the axis of the gripper member, i. e. above said central notches therein with a forwardly projecting shoulder which is shaped to form a cutting edge $28^3$ arranged to coact with cutting edges on the leading edges of the teeth on the adjacent flange $22^2$ of the gripper member. Thus when a flexible tie member is placed in said central notches as hereafter described and an upward movement is imparted to the gripper member, said tie member is severed between the coacting cutting edges.

The said retaining and guide member 28 is also formed on its rear face and above the axis of the gripper wheel with a projection $28^2$ which extends into the space between the flanges 22' and $22^2$ of the gripper member so that when said flexible tie member is inserted in said central notches in the gripper member and the latter is moved upwardly, the tie member is firmly gripped between it and the adjacent lower pair of teeth on the gripper. This gripping projection $28^2$ is so positioned that the tie member is engaged thereby before same is severed between the said coacting cutting edges.

The said retaining and guide member 28 is urged inwardly towards the frame by a cantilever spring $29^1$ which permits of the slight rocking movement which is necessary to cause the tie member to be engaged resiliently thereby.

A rocker member 30 is oscillatably mounted on a vertical pivot pin fixed to the frame somewhat to the right of the loop forming member 16, that is on the opposite side thereof to the gripper member 22 and same is provided adjacent its upper end with an opposed pair of arms 30' and $30^2$ which are alternately engageable with oppositely inclined cam surfaces $11^2$ and $11^3$ on the main slide, the former being arranged at one end of a clearance slot $11^4$ in said slide. When, as shown in Figures 1 and 8, the slide is disposed at the outer end of its stroke, the arm 30' is held in its forward position, while as the slide commences to move inwardly from this position, the arm $30^2$ is moved forwardly and remains in such forward position until the slide returns to the outer end of its stroke.

The rocker 30 is provided adjacent its lower end with an arm $30^3$ which projects laterally therefrom towards the loop forming member and the free end of this arm is received between the arms of a fork projecting laterally from a slide block 31 mounted in a transverse guide slot in the frame whereby this slide block 31 is movable towards and from the front face of the frame when the vertical spindle is rocked in the manner above explained. A forwardly extending projection 31' on this slide block constitutes the upper jaw of a retractable holding device incorporating a coacting lower jaw 32'.

This lower jaw constitutes the forward end of one arm of a bell crank lever 32 which is pivatally connected to the slide block 31 and the lower surface of this forwardly extending arm has a forwardly and downwardly inclined portion which coacts with a ramp on the upper end of a guide plunger 33 slidably mounted in the frame and urged upwardly by a stiff spring 34. The other arm $32^2$ of the bell crank lever depends behind the plunger 33 whereby when said bell crank lever is carried forwardly by the slide block 31, said depending arm engages the rear face of the plunger so that during the succeeding portion of such forward movement of the slide block the lower jaw 32' is moved downwardly and away from the upper jaw.

When, however, the slide block 31 is moved rearwardly the lower jaw is positively raised by the aforesaid ramp on the plunger 33 so that as hereafter explained a tie member is resiliently gripped between the jaws. Thus these jaws are open when fully projected, i. e. when the main slide 11 is at the outer end of its stroke, and are closed when retracted, i. e. when the slide occupies any other position.

The various stages of the operation of the mechanism are diagrammatically illustrated in Figures 14 to 21 inclusive from which the aforesaid retaining and guide member 28 is omitted except for the portions $28^2$ and $28^3$ thereof.

These diagrams show the manner of using the device on a hay baling press in which hay is compressed and tied into bales in a horizontal compression chamber, the tied bales being then discharged from the machine in the direction of the arrow shown in Figure 14. Hay baling machines of this general type are well known and do not require description herein.

Figure 14 shows the position of the tie wire when the compressed material is ready for tying and at this stage the tie wire T extends from a spool or the like (not shown) then longitudinally in the forward direction at one side of the compression chamber, then transversely through said chamber at and in front of the compressed material, and then longitudinally in the reverse direction at the other side of the chamber to and around the retractable jaws 32' and 31' which at this time are open and projected. The tie wire extends forwardly from these jaws in front of the loop forming member 16 and behind the retaining and guide member 28 (which is not shown in this sequence of diagrams) to the gripping member 22, the free end of the tie wire being bent rearwardly and extended through a notch in one of the flanges 22' whereby it is gripped between the latter and the projection $28^2$.

It will thus be understood that the tie wire at this stage extends around the forward portion of the compressed material and that a U bend is formed therein around the retractible jaws 31' and 32'. The arms forming the opposite sides of this bend are spaced apart and are disposed approximately parallel to each other.

When sufficient material has been compressed to form a bale, a loop of the tie wire is carried transversely through the compression chamber at the rear end of the bale, as shown at the right of Figure 15, and this loop is then carried forwardly towards and beyond the tying mechanism, as shown in the same figure, whereby one arm T2 of this loop is laid between the open jaws 31' and 32' and above the adjacent bend in the opposite end portion T1 of the tie wire, then in front of the loop forming member 16 and finally through the opposed pair of centrally disposed notches in the flanges of the gripper member 22. The return arm T3 of this loop of the tie wire is disposed in front and entirely clear of the tying mechanism and is used to tie the next succeeding bale as will hereafter be understood. In order to obviate unnecessary confusion in the succeeding diagrams, the major portion of this return arm T3 has been omitted therefrom.

The "needles" or other means employed to carry said loop of the tie wire transversely through the compression chamber and then forwardly to lay the arm T2 thereof in the tying mechanism does not form a part of this invention, though Figure 15 shows the forward end of a loop carrying slide 35 which may be employed to lay the arm T2 in the described position and to maintain same under tension until same is gripped by the gripping member 22.

At the stage shown in Figure 15 therefore, the tie wire T extends completely around the bale of compressed material and the end portions T1 and T2 thereof are located in the tying device in such manner that the end portion T2 extends between the arms of a bend or open loop formed in the opposite end portion T1.

After the arm T2 of the tie wire has been laid in position as described, the driving means for the main slide 11 is operated whereby the slide which at this time is disposed at the outer end of its stroke is caused to move inwards to the inner end thereof and then to return to its original position at which it then remains until a further tying operation is to be performed.

During the initial portion of the inward stroke of the slide 11 the arm $30^2$ on the rocker 30 is forced outwardly by the coacting cam surface $11^3$ on the slide whereby the slide block 31 is retracted and the jaws 31' and 32' simultaneously closed to grip the intervening portion of the end portion T2 of the tie wire. (See Figure 16.) This end portion T2 is sometimes hereafter referred to as the arm $T^2$.

As previously explained the closing of these jaws is produced by the upward movement of the pivoted lower jaw 32' and such upward movement is effected positively by the inclined face on the plunger 33. It is to be noted, however, that as this plunger is spring loaded, the tie wire is resiliently gripped between the jaws so that the latter automatically adapt themselves to variations in the gauge of the tie.

Now, as previously explained, the loop forming member 16 is operated by rack and pinion mechanism from the main slide 11 but this member 16 remains stationary during the initial inward movement of said slide owing to the aforesaid lost motion connection between the loop forming member and the pinion 13. Thus the jaws 31' and 32' are closed and retracted before the loop forming member 16 commences its forward clockwise movement. See Figure 5A.

At the commencement of the operation the tip or free end of the arcuate arm $16^2$ of the loop forming member is disposed above and clear of the arm T2 of the tie wire and when said jaws 31' and 32' are closed and retracted as previously described, the adjacent portion of said arm of the tie wire is moved inwardly towards the frame 10 and baling chamber and behind the plane in which said tip of the arm $16^2$ rotates.

Accordingly as the slide 11 continues its inward movement and the tip of the arm $16^2$ commences to move downwards it passes above the arm T2 of the tie wire and then below the lower arm of the opposite end portion T1, as also shown in Figure 16.

When the arcuate arm is disposed approximately in the position shown in Figure 16, an intermittent movement is imparted to the gripper member 22 so that that portion of the arm T2 which extends through the aligned central notches thereof is moved upwardly through a distance approximately equal to one half of the pitch of the teeth on said gripper member. During this upward movement the free end of the portion T1 of the tie wire is released by the gripper member while the arm T2 is simultaneously moved into contact with the cutting edge $28^3$ in preparation for the subsequent severing operation. This same forward movement causes said arm T2 to be engaged by the gripping projection $28^2$ whereby after the latter is severed as hereinafter described, the return arm T3 will be held by the gripper in readiness for the next succeeding tying operation.

After the upper arm of the end T1 is released as explained, the projection $16^4$ of the arm arcuate $16^2$ engages said upper arm and commences to move same downwardly in front of the end T2 and behind the other or lower arm of T1, such lower arm being pressed forwardly for this purpose by the guide flange $16^5$, Figures 17 and 18. Thus the end portion T1 is looped around the opposite end portion T2 in the form of a half hitch.

Shortly after the said projection $16^5$ engages the upper arm of the bend in T1, the tip of the arm $16^2$ and which at this time is commencing to move upwardly, passes above the adjacent portion of the lower arm of said bend adjacent to the gripper member 22 and shortly afterwards the downwardly and rearwardly inclined lower surface of the tip of the spring strip 20 engages the end T2 of the tie wire adjacent to the gripper and is moved forwardly thereby and away from the coacting tip of the arm $16^2$. (See Figure 11.) Thus the jaws constituted by these coacting tips are opened and the wire passes into the aforesaid clearance space 21 behind the retaining shoulders $20^3$.

It should here be noted that this action takes place in close proximity to the gripper member 22 which in conjunction with the arm $16^2$ accurately locates the end T2 for engagement by the said jaws.

As the arm T2 passes between and is held by the said jaws a second upward movement is imparted to the gripper member 22 whereby the arm T2 is severed from the return arm T3, which latter is still firmly held by the projection $28^2$ which forms a retaining bend T4 therein.

At this stage the loop forming member commences its return movement whereby the now free end of T2 is carried downwards by the arm $16^2$ and in front of that portion of the lower arm of T1 which is disposed adjacent to the gripper member 22. (See Figure 19.)

Continuing its return movement the said free end of T2 is carried upwardly behind the said lower arm of T1 adjacent to the still retracted holding jaws 31' and 32' so that said end portion T2 is looped around the lower arm of T1 and so completes the knot tying operation as the loop forming member reaches and stops at its original position. (See Figure 20.)

Also, as the slide 11 reaches the outer end of its stroke the closed retracted holding jaws 31' and 32' are again projected and opened to release the arm T2. It will also be understood that during the return movement of the slide 11 the actuator 23 for the gripper member 22 is caused to undergo two rearward movements which together are equal to the pitch of the teeth on said gripper member, but during such retrograde movements the gripper member is held by the detent 25 and the actuator merely ratchets thereover.

When the knot is tied and the tie wire is released by the tying mechanism, the tied bale is free to be moved forwardly as further material is compressed in the compression chamber whereby the formed knot is pulled clear of the tying mechanism as indicated in Figure 21. An important feature of the invention therefore is that the mechanism is so devised that the tie wire and the knot formed therein is readily freed from the tying mechanism when the tying operation is complete.

Now immediately following the operation of tying one bale the tie wire arm T3 (which now becomes the end T1 for the next succeeding bale) extends rearwardly relatively to the compression chamber and then transversely therethrough in front of the material being compressed, as shown in Figure 21.

As the compression of material proceeds in the chamber, however, this transversely extending portion is progressively moved forwardly until when sufficient material has been accumulated to form another bale, the forward end of the latter is located in advance of the knot tying mechanism as shown in Figure 14.

To recapitulate the knot tying operation it will be clear from the sequence of diagrams that during the forward movement of the loop forming member $16^2$ a half hitch is formed in the end portion T1 of the tie wire around the opposite end portion T2 and that during the return movement of the said member a half hitch is formed in the end portion T2 and around the end portion T1.

Finally as the formed knot is pulled clear of the tying device, the tension to which the tie wire is subjected causes the two half hitches to slide together and undergo compression whereby the bends are made more sharp and the knot more compact.

It is found that a knot so formed will rarely, if ever, become undone under tension and in any event is quite satisfactory and reliable for the purpose.

As above indicated, the mechanism has been devised primarily for use in forming knots in flexible tie wires and for convenience has been so described in the foregoing explanation of its operation. The said mechanism, however, is equally satisfactory for tying knots in twine, cord and other flexible members, and it is therefore to be understood that the foregoing references to tie wires are made by way of illustration only.

The expressions "first flexible member" and "second flexible member" or any equivalent expressions employed in the ensuing claims are to be understood as comprehending either entirely separate members or spaced portions of a single flexible member, while expressions importing direction or position are to be understood as referring only to relative directions or relative positions.

I claim:

1. Knot tying mechanism comprising a support, releasable gripping means movably mounted on said support and adapted to engage one end of a flexible member, abutment means on said support at a position spaced from said releasable gripping means, whereby said flexible member may extend from the latter to and partly around said abutment means and may then return in the opposite direction so that a substantially U-shaped bend is formed in such member with the arms thereof spaced apart and disposed approximately parallel to each other, a spaced pair of releasable holding means on said support and adapted to engage corresponding portions of a second flexible member arranged in front of the bend in and between the said arms of the firstmentioned flexible member, means operable to actuate said releasable gripping means to disengage the corresponding arm of the firstmentioned flexible member, a first turn-forming means movably mounted on said support between said releasable gripping means and said abutment means, such turn-forming means being operable to displace such disengaged arm whereby it is moved in front of the adjacent portion of said second flexible member and then behind the adjacent portion of the other arm of said firstmentioned flexible member thereby to convert said U bend in the latter into a turn which encloses said second member, means operable subsequently to actuate that one of said spaced releasable holding means which is disposed adjacent to said releasable gripping means, whereby the corresponding portion of said second flexible member is released, a second turn-forming means movably mounted on said support between said releasable gripping means and said abutment means, such second turn-forming means being operable to displace the thus released portion of said second flexible member whereby same is moved in front of and then partly around and behind said other arm of the firstmentioned flexible member so that said second flexible member is formed with a turn which encloses said other arm of the firstmentioned member and means for actuating in timed relation said releasable gripping means, said spaced releasable holding means and said first and second turn-forming means.

2. Knot tying mechanism comprising a support, releasable gripping means mounted on said support and adapted to engage the free end portion of a flexible member, abutment means on said support at a portion spaced from said releasable gripping means whereby said flexible member may extend from the latter to and partly around said abutment means and may then return in the opposite direction so that a substantially U-shaped bend is formed therein with the arms thereof spaced apart and disposed approximately parallel to each other, a first releasable holding means on said support adjacent said abutment means thereon, a second releasable holding means on said support adjacent said releasable gripping means thereon, such releasable holding means being adapted to engage corresponding portions of a second flexible member so that the latter extends in front of the bend in, and between the arms of, the firstmentioned member, said first releasable holding means being retractible inwardly whereby the portion of said second flexible member engaged thereby may be moved inwardly, a first turn-forming means movably mounted on said support between said releasable gripping means and said abutment means and adapted to engage and displace that arm of the firstmentioned member which initially extends therebetween so that such arm is moved in front of the adjacent portion of said second member and then behind the other arm of the firstmentioned member, the aforesaid U bend in the latter being thus converted into a turn which encloses said second member, a second turn-forming means movably mounted on said support between said abutment means and said releasable gripping means, such lastmentioned means being adapted to engage the adjacent portion of said second flexible member, means operable to actuate said lastmentioned means to move said second flexible member in front of and then partly around and behind said other arm of the firstmentioned member thereby forming in said second member a turn which encloses said firstmentioned member and means operable to actuate said releasable gripping means, said spaced releasable holding means and said first and second turn-forming means in timed relation.

3. Knot typing mechanism comprising a support, a releasable gripping means movably mounted on said support, a first releasable holding means movably mounted on said support at a position spaced from said releasable gripping means whereby a flexible member having its free end portion held by the latter may extend to and partly around said releasable holding means and may then return in the opposite direction whereby such flexible member is formed with a substantially U-shaped bend having spaced arms disposed approximately parallel to each other, said releasable holding means being also adapted for releasable engagement with the adjacent portion of a second flexible member which extends in front of the bend in and between the said arms of the first-mentioned flexible member, a second releasable holding means on said support adjacent said releasable gripping means and adapted to engage the adjacent portion of said second flexible member, means operable to retract said first releasable holding means inwardly towards said support after said second flexible member has been engaged thereby, a first turn-forming means movably mounted on said support between said releasable gripping means and said first releasable holding means, such turn-forming means being operable when said free end portion of the firstmentioned flexible member is released by said releasable gripping means to displace the arm so released and move same in front of the adjacent portion of the second flexible member and then behind the other arm of said firstmentioned flexible member to convert the aforesaid U bend in the latter into a turn which encloses said second flexible member, a second turn-forming means movably mounted on said support between said releasable gripping means and said first releasable holding means, such second turn-forming means being adapted to engage said second flexible member adjacent said second releasable holding means and to move same in front of and then partly around and behind said other arm of the firstmentioned flexible member, thereby to form in said second flexible member a turn which encloses said firstmentioned flexible member and means operable to actuate in timed relation said releasable gripping means, said first and second releasable holding means and said first and second turn-forming means.

4. Knot tying mechanism comprising a support, a rotary gripping and cutting means mounted on said support, means operable to actuate said gripping and cutting means intermittently to grip and cut flexible members engaged thereby, a releasable holding means on said support at a position spaced from said gripping and cutting means, such releasable holding means comprising retractible coacting jaws, said rotary gripping and cutting means being adapted to engage the free end portion of a first flexible member whereby same may extend to and partly around the jaws of said releasable holding means and may then extend in the opposite direction so that a substantially U-shaped bend is formed therein with the arms thereof spaced apart and disposed approximately parallel to each other, said jaws being also adapted to clamp therebetween the adjacent portion of a second flexible member which extends in front of said bend in the first flexible member and between the spaced arms of the latter to said rotary gripping and cutting means for engagement by the latter, means operable when said second flexible member is held between said jaws, to retract the latter inwardly towards said support, a first turn-forming means movably mounted on the support between said rotary gripping and cutting means and said releasable holding means, means operable in timed relation with said gripping and cutting means and said releasable holding means to actuate said first turn-forming means whereby same engages that arm of the first flexible member which extends from the gripping and cutting means and displaces same whereby it is moved behind the adjacent portion of said second flexible member and then in front of the other arm of the first flexible member, thereby converting the aforesaid U bend in the first flexible member into a turn which encloses the second flexible member, a second turn-forming means movably mounted on said support between said rotary gripping and cutting means and said releasable holding means, means operable after said second flexible member has been cut by said gripping and cutting means to actuate said second turn-forming means whereby same engages and displaces said second flexible member and forms therein a turn which encloses said other arm of the first flexible member and means operable to actuate said releasable holding means and said first and second turn-forming means in timed relation with said rotary gripping and cutting means.

5. Knot tying mechanism according to claim 4 wherein the axis of rotation of said rotary gripping and cutting means is so disposed as to be approximately parallel to said flexible members before said turns are formed therein and wherein said rotary gripping and cutting means comprises a spaced coaxially arranged pair of circumferentially toothed elements with the teeth thereof disposed in alignment, and coacting gripping and cutting means including a gripping member which extends into a circumferential space between said toothed elements and a cutting element disposed substantially in contact with the outer face of that toothed element which is disposed adjacent to said turn-forming means.

6. Knot tying mechanism comprising a support, a releasable gripping means on said support, an abutment means on the support at a position spaced from said gripping means, whereby a first flexible member held adjacent a free end thereof by said gripping means may extend therefrom to and partly around said abutment means and may then return in the opposite direction so that a substantially U-shaped bend is formed in such member with the arms thereof spaced apart and disposed approximately parallel to each other, a first releasable holding means on said support adjacent said abutment means, a second releasable holding means on said support adjacent said releasable gripping means, such spaced releasable holding means being adapted to engage corresponding portions of a second flexible member arranged in front of the bend and between the arms of the first mentioned flexible member, a reversible angularly movable member on said support between said releasable gripping means and said abutment means with its axis of movement disposed substantially at right angles to a plane approximately containing said spaced arms of the first flexible memher, an arm on said angularly movable member with its free end portion spaced from said axis thereof, retaining means on the free end portion of said arm for engaging said second flexible member, said arm being disposed substantially behind said plane containing the spaced arms of the first flexible member, an eccentric projection on said angularly movable member, means operable to impart successive forward and reverse movements to said angularly movable member and means operable to actuate said releasable gripping means and said spaced releasable holding means in timed relation therewith whereby as said angularly movable member moves forwardly from a normal position thereof, said eccentric abutment thereon engages and displaces that arm of the first flexible member which was initially held by said releasable gripping means, whereby such arm is moved in front of the adjacent portion of said second flexible member and then behind the other arm of the first flexible member and whereby during the subsequent forward movement of said angularly movable member, said retaining means on the arm thereon engages the adjacent portion of said second flexible member so that when said angularly movable member is subsequently returning to its normal position, it forms in said second flexible member a turn which encloses said other arm of the first flexible member.

7. Knot tying mechanism comprising a support, a releasable gripping means on said support, a releasable holding means on said support at a position spaced from said gripping means, whereby a first flexible member having one free end portion held by said gripping means may extend therefrom to and partly around said releasable holding means and may then return in the opposite direction so that a substantially U-shaped bend is formed in the member with the arms thereof spaced apart and disposed approximately parallel to each other, said spaced gripping and holding means being also adapted to engage spaced portions of a second flexible member arranged in front of said bend in and between the arms of the first flexible member, a reversible angularly movable member mounted on the support between the said gripping and holding means with its axis of movement disposed substantially at right angles to a plane approximately containing said spaced arms of the first flexible member and which axis substantially intersects said second flexible member, an arcuate arm on said angularly movable member, such arm having its free end portion spaced from the axis of said angularly movable member and having its outer face disposed behind said plane which approximately contains the spaced arms of the first flexible member, retaining means on the free end portion of said arm for engaging and holding said second flexible member, a forwardly projecting eccentric abutment on said angularly movable member adapted to engage that arm of the first flexible member which initially extends from said releasable gripping means to said releasable holding means, means operable to impart successive forward and return movements to said angularly movable member and means operable to actuate said releasable gripping means and said releasable holding means in timed relation with said angularly movable member, whereby as the latter moves forwardly from a normal position thereof the eccentric abutment thereon engages and displaces the lastmentioned arm of the firstmentioned member whereby same is moved in front of the second flexible member and then behind the other arm of the first flexible member, so that the initial U bend in the latter is converted into a turn which encloses said second member and whereby when said angularly movable member approaches the forward end of its movement, the said retaining means on the arcuate arm engage said second flexible member, so that when said arm is subsequently returning to its normal position, the thus engaged portion of said second flexible member is moved in front of and then partly around and behind said other arm of the first flexible member thereby forming in said second member a turn which encloses said first member.

8. Knot tying mechanism comprising a support, a releasable gripping means mounted on said support and projecting from a face thereof, abutment means projecting from said face of the support at a position spaced from said releasable gripping means, an angularly movable member mounted on said support between said releasable gripping means and said abutment means and having its axis of movement disposed substantially at right angles to said face of the support, an arcuate arm on said angularly movable member and having its free end portion spaced from said axis, retaining means on said free end portion of the arcuate arm for engaging and holding a flexible member, a forwardly projecting abutment disposed eccentrically on said angularly movable member at a position spaced from the free end portion of said angularly movable arm, said releasable gripping means being adapted to engage the free end portion of a first flexible member so that same may extend therefrom in front of said angularly movable member to and partly around said abutment means and may then return in the opposite direction whereby a substantially U-shaped bend is formed therein with the arms thereof spaced apart and disposed approximately parallel to each other, a first releasable holding means mounted on said support adjacent said abutment means thereon, a second releasable holding means on said support adjacent said releasable gripping means thereon, such spaced holding means being adapted to engage and hold corresponding portions of a second flexible member which extends in front of the bend in and between the said arms of the first flexible member, means operable when said first and second flexible members are arranged as aforesaid to impart successive forward and reverse movements to said angularly movable member and means operable in timed relation with said angularly movable member to actuate said releasable gripping means and said first and second releasable holding means, whereby as said angularly movable member moves forwardly from a normal position thereof, said forwardly projecting abutment thereon engages and displaces that arm of the first flexible member which initially extends from said releasable gripping means to said abutment means so that such arm is moved in front of the second flexible member and then behind the other arm of said first flexible member whereby the aforesaid U bend in the latter is converted into a turn which encloses said second member and whereby as said angularly movable member approaches the limit of its forward movement, said retaining means on the free end portion of the arcuate arm engages said second flexible member adjacent said second releasable holding means so that during the reverse movement of the arcuate arm, said second flexible member is moved in front of and then partly around and behind said other arm of the first member thereby forming in said second flexible member a turn which encloses said first flexible member.

9. Knot tying mechanism comprising a support, a gripping and cutting means mounted on said support and projecting from a face thereof, releasable holding means projecting from said face of the support at a position spaced from said gripping and cutting means, an angularly movable member mounted on said support, between said gripping and cutting means and said releasable holding means and having its axis of movement disposed substantially at right angles to said face of the support, said angularly movable member including an arcuate arm having its free end portion spaced from said axis and being disposed substantially in a plane transverse thereto, retaining means on said free end portion of the arcuate arm for engaging and holding a flexible member, a forwardly projecting abutment disposed eccentrically on said angularly movable member at a position spaced from the free end portion of said arcuate arm, said gripping and cutting means being adapted to engage the free end portion of a first flexible member so that same may extend therefrom in front of said angularly movable member to and partly around said releasable holding means and may then return in the opposite direction whereby a substantially U shaped bend is formed therein with the arms thereof spaced apart and disposed approximately parallel to each other, said releasable holding means and said gripping and cutting means being also adapted to engage and hold corresponding portions of a second flexible member which extends in front of the bend in, and between the said arms of, the first flexible member, means operable to displace said releasable holding means substantially parallel to the axis of the angularly movable member, means operable when said first and second flexible members are arranged as aforesaid to impart successive forward and reverse movements to said angularly movable member and means operable in timed relation with said angularly movable member to actuate said rotary gripping and cutting member and said releasable holding means, whereby as said angularly movable member moves forwardly from a normal position thereof, said forwardly projecting abutment thereon engages and displaces that arm of the first flexible member which extends from said gripping and cutting means to said releasable holding means so that such arm is moved in front of the second flexible member and then behind the other arm of said first flexible member whereby the aforesaid bend in the latter is converted into a turn which encloses said second member and whereby as said angularly movable member approaches the limit of its forward movement, said retaining means on the free end portion of the arcuate arm engages said second flexible member adjacent said gripping and cutting means so that during the reverse movement of the arcuate arm, said second flexible member is moved in front of then partly around and behind said other arm of the first flexible member thereby forming in said second flexible member a turn which encloses said first flexible member.

10. Knot tying mechanism according to claim 9 wherein said gripping and cutting means comprises a gripping and cutting rotatively mounted on said support with its axis disposed substantially radially with respect to said angularly movable member and a coacting gripping and cutting member rockably mounted on the support and including a guide member extending in front of said angularly movable member and substantially parallel to the axis of said rotary gripping and cutting member, such guide member being secured adjacent one end thereof to said rockable coacting gripping and cutting member.

11. Knot tying mechanism according to claim 9 wherein the said releasable holding means comprises a slidable jaw member guided for movements substantially parallel to the axis of rotation of said angularly movable member, a coacting jaw member pivotally connected to said slidable jaw member and means operable to actuate said pivoted jaw member during sliding movements of said slidable jaw member whereby said jaws are open when projected and vice versa.

12. Knot tying mechanism according to claim 9 including actuating means comprising a slide, rack teeth on the slide, a pinion engageable with said rack teeth, means coupling said pinion to said angularly movable member, a cam surface on said slide, a cam follower engaging said cam surface and arranged to operate said rotary gripping and cutting member and means interconnecting said slide and said releasable holding means to project and retract the latter, said releasable holding means comprising a slidable jaw and a coacting jaw pivotally connected to said slidable jaw and including means operable consequent upon each inward movement of the slidable jaw to move said pivoted jaw to its closed position.

THOMAS JAMES BAILEY CONNOR.

REFERENCES CITED

The following references are of record in the file of this patent:

UNITED STATES PATENTS

| Number | Name | Date |
|---|---|---|
| 218,038 | Locke | July 29, 1879 |
| 252,482 | Locke | Jan. 17, 1882 |
| 271,126 | Robbins | Jan. 23, 1883 |
| 906,728 | Lie | Dec. 15, 1908 |
| 1,774,898 | Novick | Sept. 2, 1930 |
| 1,830,208 | Norling | Nov. 3, 1931 |
| 2,010,591 | Haynes et al. | Aug. 6, 1935 |
| 2,239,342 | Rosenfelder | Apr. 22, 1941 |
| 2,300,051 | Lind | Oct. 27, 1942 |